United States Patent
Sterman

(10) Patent No.: US 8,917,839 B2
(45) Date of Patent: *Dec. 23, 2014

(54) PROVIDING EFFECTIVE ADVERTISING VIA SYNCHRONIZED TELEPHONE AND DATA STREAMS

(75) Inventor: Baruch Sterman, Efrat (IL)

(73) Assignee: Vonage Newworks, LLC, Holmdel, NJ (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/284,275

(22) Filed: Oct. 28, 2011

(65) Prior Publication Data

US 2012/0177033 A1    Jul. 12, 2012

Related U.S. Application Data

(63) Continuation of application No. 11/883,605, filed as application No. PCT/IL2006/000133 on Feb. 2, 2006, now Pat. No. 8,073,118.

(60) Provisional application No. 60/649,889, filed on Feb. 3, 2005.

(51) Int. Cl.
  *H04M 15/00* (2006.01)
  *H04L 29/06* (2006.01)
  *G06Q 30/02* (2012.01)
  *H04M 3/487* (2006.01)
  *H04L 29/08* (2006.01)
  *H04M 3/42* (2006.01)

(52) U.S. Cl.
  CPC ............... *H04L 65/40* (2013.01); *G06Q 30/02* (2013.01); *G06Q 30/0264* (2013.01); *H04M 3/4878* (2013.01); *H04L 65/1069* (2013.01); *H04L 67/306* (2013.01); *H04M 3/42068* (2013.01)
  USPC .................. 379/114.13; 379/218.01; 370/352

(58) Field of Classification Search
  CPC .......................................................... H04M 3/42
  USPC .................. 379/114.13, 207.16; 370/352
  See application file for complete search history.

(56) References Cited

U.S. PATENT DOCUMENTS

| | | |
|---|---|---|
| 6,937,699 B1 | 8/2005 | Schuster et al. |
| 7,466,805 B2 | 12/2008 | Timmins et al. |
| 8,031,555 B2 | 10/2011 | Schuster et al. |
| 2003/0119492 A1 | 6/2003 | Timmins et al. |
| 2004/0255034 A1 | 12/2004 | Choi |
| 2006/0109969 A1* | 5/2006 | Oh .......................... 379/207.16 |
| 2006/0147010 A1* | 7/2006 | Batni et al. ............... 379/202.01 |
| 2007/0047523 A1 | 3/2007 | Jiang |
| 2007/0121882 A1 | 5/2007 | Timmins et al. |
| 2007/0147391 A1 | 6/2007 | Wilhoite et al. |
| 2008/0117463 A1* | 5/2008 | Ohkubo et al. ............. 358/1.18 |
| 2009/0046704 A1 | 2/2009 | Sternam |
| 2013/0013410 A1* | 1/2013 | Hoyle ........................ 705/14.54 |

OTHER PUBLICATIONS

J. Rosenberg et al., "SIP; Session Initiation Protocol", RFC 3261, Jun. 2002, pp. 1-10.
H. Schulzrinne et al., "Real Time Streaming Protocol (RTSP)", RFC 2326, Apr. 1998, pp. 1-10.
E. Westheimer, "Network Host Status", Apr. 1972, 3 pages.
H. Schulzrinne et al., "Real Time Steaming Protocol (TRSP)", Apr. 1998, 86 pages.
International Search Report issued in PCT/IL2006/000133 on Jul. 15, 2008.

* cited by examiner

*Primary Examiner* — Creighton Smith
(74) *Attorney, Agent, or Firm* — Nixon & Vanderhye, P.C.; Joseph Pagnotta

(57) ABSTRACT

Information, such as advertising, is presented to VoIP users via a combination of telephone and data streams during session initiation via an IP phone or a personal computer. A proxy server that receives the call request coordinates with a media server to transmit targeted advertising to the caller during the post dial delay interval. After the advertisement concludes, the call continues normally.

17 Claims, 4 Drawing Sheets

PROVIDING EFFECTIVE ADVERTISING VIA SYNCHRONIZED TELEPHONE AND DATA STREAMS

CROSS-REFERENCE TO RELATED APPLICATIONS

This application is a continuation of U.S. application Ser. No. 11/883,605, filed May 19, 2008 now U.S. Pat. No. 8,073,118, which is a U.S. National Stage of PCT Application No. PCT/IL2006/00133, filed Feb. 2, 2006, which claims the benefit of Provisional Application No. 60/649,889, filed Feb. 3, 2005, the contents of all of which are herein incorporated by reference.

BACKGROUND OF THE INVENTION

1. Field of the Invention

This invention relates to communications techniques over a data network. More particularly, this invention relates to telephonic communication in which information is transmitted by synchronization of voice and data streams.

2. Description of the Related Art

TABLE 1

Acronyms and Abbreviations

| | |
|---|---|
| IETF | Internet Engineering Task Force IP Internet Protocol |
| ITU | International Telecommunication Union |
| ITU-T ITU | Telecommunication Standardization Sector |
| PDD | Post-Dial Delay |
| PSTN | Public Switched Telephone Network |
| QoS | Quality of Service |
| RTSP | Real Time Streaming Protocol |
| SIP | Session Initiation Protocol |
| SS7 | Signaling System 7 |
| VoIP | Voice over Internet Protocol |

Voice over Internet Protocol (VoIP), also known as IP telephony, has become a preferred technique for routing of voice communications over the Internet and other data networks. Essentially, audio information flows primarily through a packet-switched data network, instead of traditional dedicated, circuit switched voice transmission lines. So long as the information remains in the data network, there is little marginal cost involved in processing the call. However, many such communications terminate in the public switched telephone network (PSTN), at which point charges may be incurred.

The popularity of VoIP has resulted in the development of many protocols dealing with various aspects of data formatting and communications, including call models and controls. Examples include ITU-T H.323, and ITU-T H.225. During the last decade, the IETF Session Initiation Protocol (SIP) has become an increasingly important signaling protocol for VoIP communications. SIP is formally defined in RFC 3261, available at the URL "http://www.ietf.org/rfc/rfc3261.txt".

SUMMARY OF THE INVENTION

Merchants have lists and profiles of their customers and look for ways to target advertising toward the buying habits of these specific customers and give these customers incentives to buy more. One way they do this sort of targeted advertising now is by sending coupons in the mail. Offering free packet telephony service, e.g., VoIP service, is a faster and possibly cheaper way to reach these customers in a way that will build customer goodwill. According to disclosed embodiments of the invention, information content, typically effective advertising, is presented to users via telephone, or via a combination of telephone and data streams. One embodiment of the invention employs VoIP. A user initiates a VoIP call in a conventional manner, typically through an IP phone or a personal computer, i.e., by picking up an instrument and dialing. Such calls almost invariably require a time interval for session initiation, known as a "post dial delay" (PDD). During the call setup phase, an advertisement, typically originating from a merchant-operated media server, is played to the calling party. After the advertisement concludes, the call continues normally.

In some embodiments multimedia communication techniques are employed to provide additional information and to enhance effectiveness of advertising or other types of communications. When the telephone instrument is connected to a computer, or the call is made using VoIP client software on a computer, visual information, typically a more detailed advertisement, may be displayed on the computer's monitor. The multimedia information is synchronized with the audio information received over the telephone instrument for increased effectiveness.

One way of increasing the effectiveness of advertising while keeping it short is to refer the user or customer to a more detailed source of information. A multimedia approach can be used, where the voice advertisement refers the user to his computer screen where a more detailed advertisement or coupon is waiting. Alternatively, in embodiments in which the VoIP device is not connected to a computer, pressing a key on the telephone keypad may enable the user to hear more details.

In any case, revenue from the advertising offsets PSTN termination charges and other costs of the VoIP provider, who can then reduce or even eliminate calling charges to the end user. The end user, who is a customer of the VoIP provider, is disposed to tolerate the advertisements in order to avoid such charges.

In an aspect of the invention, the VoIP provider is able to obtain profiles of its customers. The profiles can be stored in a database and made available to advertisers, enabling them to target advertisements. The effectiveness of targeted advertising as compared with non-directed advertising is a factor that motivates advertisers to participate with the VoIP provider in offering VoIP service to these customers at reduced cost or at no cost to the customers.

An example of an offering that takes all these factors into consideration is an offering by a retail chain of free domestic VoIP phone calls to its most valued customers. Typically, such customers have a store discount card, which tracks their purchases. When a customer reaches some predetermined level of purchases, he is given a device that connects to his computer and to a standard telephone, thereby enabling the customer to place VoIP calls. Conditioning continuation of the VoIP services to an amount spent on goods, provide a strong loyalty incentive to the retail chains.

An embodiment of the invention provides a method for targeted advertising, which is carried out by maintaining respective profiles of a group of individuals who are affiliated with an organization, providing the individuals with access to a packet telephony service, and receiving a request from an individual in the group to establish a telephonic connection with a callee over a packet network using the packet telephony service. In response to the request, the method is further carried out by transmitting over the packet network to the individual a notification provided by the organization and targeted according to a respective profile of the individual, and completing the telephonic connection.

According to an aspect of the method, the packet telephony service is provided without charge by the organization.

In still another aspect of the method, the telephonic connection is completed subsequent to completion of the step of transmitting the notification over the packet network.

In one aspect of the method, completing the telephonic connection includes establishing connectivity with a public switched telephone network.

According to an additional aspect of the method, the notification includes multimedia data directed to a computer of the individual.

According to aspect of the method, the organization is a commercial organization, and the individuals are customers of the organization.

According to a further aspect of the method, the profiles reflect purchases made respectively by the individuals from the organization.

According to yet another aspect of the method, the packet telephony service is provided by a VoIP service provider outside the organization, and the organization pays the VoIP service provider to provide the packet telephony service to the individuals.

An embodiment of the invention provides a method of synchronized communications, which is carried out by receiving a request from a caller via a packet-switched communications network to establish a telephonic connection with a callee, thereafter instructing a content provider to transmit a notification to the caller via the network, and completing the telephonic connection.

Another aspect of the method includes accessing a database having descriptive information relating to the caller, and composing the notification responsively to the descriptive information.

Still another aspect of the method includes activating a search engine to obtain descriptive information relating to the caller, and composing the notification responsively to the descriptive information.

An embodiment of the invention provides a computer software product for providing synchronized communications, including a computer-readable medium in which computer program instructions are stored, which instructions, when read by a computer, cause the computer to receive a request from a caller via a packet-switched communications network, to establish a telephonic connection with a callee, thereafter to instruct a content provider to transmit a notification to the caller via the network, and to complete the telephonic connection.

An embodiment of the invention provides a communications system of synchronized communications, including a proxy server operative for receiving a request from a caller via a packet-switched communications network to establish a telephonic connection with a callee, and a media server connected to the network, wherein the proxy server is operative for instructing the media server to transmit a notification to the caller via the network, and for completing the telephonic connection.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

System Architecture.

Figure 1:
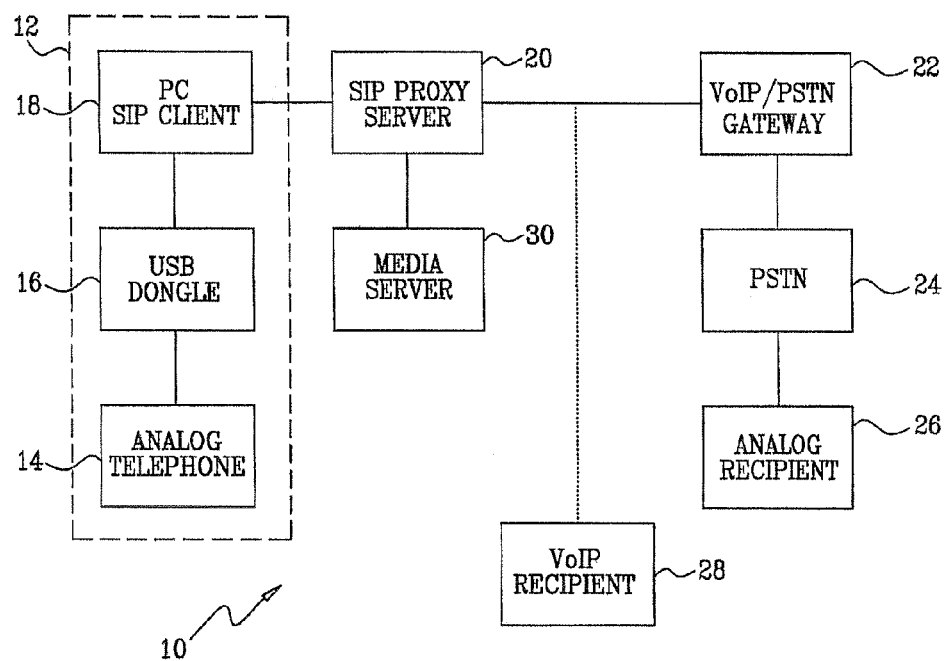
FIG. 1 is a block diagram of a system for communication via synchronized telephone and data streams, in accordance with a disclosed embodiment of the invention.

Turning now to the drawings, reference is initially made to FIG. 1, which is a block diagram of a system 10 for communication via synchronized telephone and data streams, in accordance with a disclosed embodiment of the invention. The system 10 and its operation are often explained with reference to the SIP protocol. However, this is exemplary, and those skilled in the art will be able to practice the invention mutatis mutandis using other communications protocols, such as the above-noted ITU-T H.323 protocol or peer-to-peer protocols. The invention is sometimes disclosed with reference to advertising. However, its principles are applicable to many forms of communication where information directed to a client can be personalized or targeted, e.g., a community of church members or a school group. In such groups, a common denominator of mutual interest provides sufficient incentive to focus the content presented to the group.

The system 10 supports any number of customers concurrently, represented by a customer 12, who has a telephone instrument 14. The telephone instrument 14, which is typically an analog telephone, is connected to an adapter 16, shown as a USB dongle that plugs into a computer 18. The adapter 16 is integrated with software running on the computer 18, which is capable of placing telephone calls using an appropriate protocol that supports a packet telephony service.

The protocol may be the above-noted Session Initiation Protocol. The computer 18 is connected to a data network, which is typically a packet-switched network, e.g., the Internet. When the customer 12 places a call by dialing a number on the telephone instrument 14, the computer 18 is triggered, such that signaling flows from the computer 18 to a SIP proxy server 20 located somewhere on the data network. Often, when the customer 12 has dialed a number that could be reached via the PSTN, the call flows through a signaling gateway 22 that establishes connectivity between VoIP and a standard telephone protocol, e.g., the well-known ITU Signaling System 7 (SS7) protocol. The call then continues onward to terminate on a PSTN 24, ultimately reaching a callee or recipient 26, which is connected to the PSTN 24. The recipient 26 typically has a conventional analog telephone instrument, but could employ other known telephone technologies connectable to the PSTN 24, for example the recipient's telephone could be digital device, such as a cellular telephone. Alternatively, the call could be directed to a VoIP recipient 28 configured to communicate using the SIP protocol, in which case the gateway 22 and the PSTN 24 are not included in the call's path. In the case of conference calls, in which there are a plurality of recipients, many combinations of PSTN and VoIP recipients may be reached by appropriate directives from the proxy server 20.

As is explained in further detail hereinbelow, during an interval that includes at least a portion of the post-dial delay, insertion of a notification, e.g., an advertisement from a content provider, shown as a media server 30, occurs. The media server 30 is connected in the data network. Indeed, the media server 30 may be a logical division of the proxy server 20, both being integrated in a common physical unit. The media server 30 may insert a voice stream or a multimedia stream that contains the notification or advertisement.

Typically, the packet telephony service provided by the system 10 is supported by a sponsor, such as a merchant, who maintains profiles of its customers. The packet telephony service is normally provided by a VoIP service provider outside said organization, which is paid by the merchant for providing the packet telephony service to the customers. The media server 30 is controlled by the sponsoring merchant. Preferred customers, e.g., the customer 12, are then provided with suitable equipment by the merchant, such as the adapter 16, to access the proxy server 20 and exploit the packet telephony service at reduced cost or at no cost. The advertising messages produced by the media server 30 are then tailored to the profile of the particular customer using the packet telephony service.

In some embodiments, the call flow is interrupted until completion of the notification from the media server 30 before being allowed to proceed to the gateway 22 (or to the recipient 28). In other embodiments, the proxy server 20 simply monitors the progress of session initiation, and need not delay call setup. For example, when the customer 12 has contracted for a particular QoS, the notification from the media server 30 may be required to terminate on completion of call setup, or alternatively after a predetermined time interval has expired, in order not to violate the agreement.

Operation.

Figure 2:
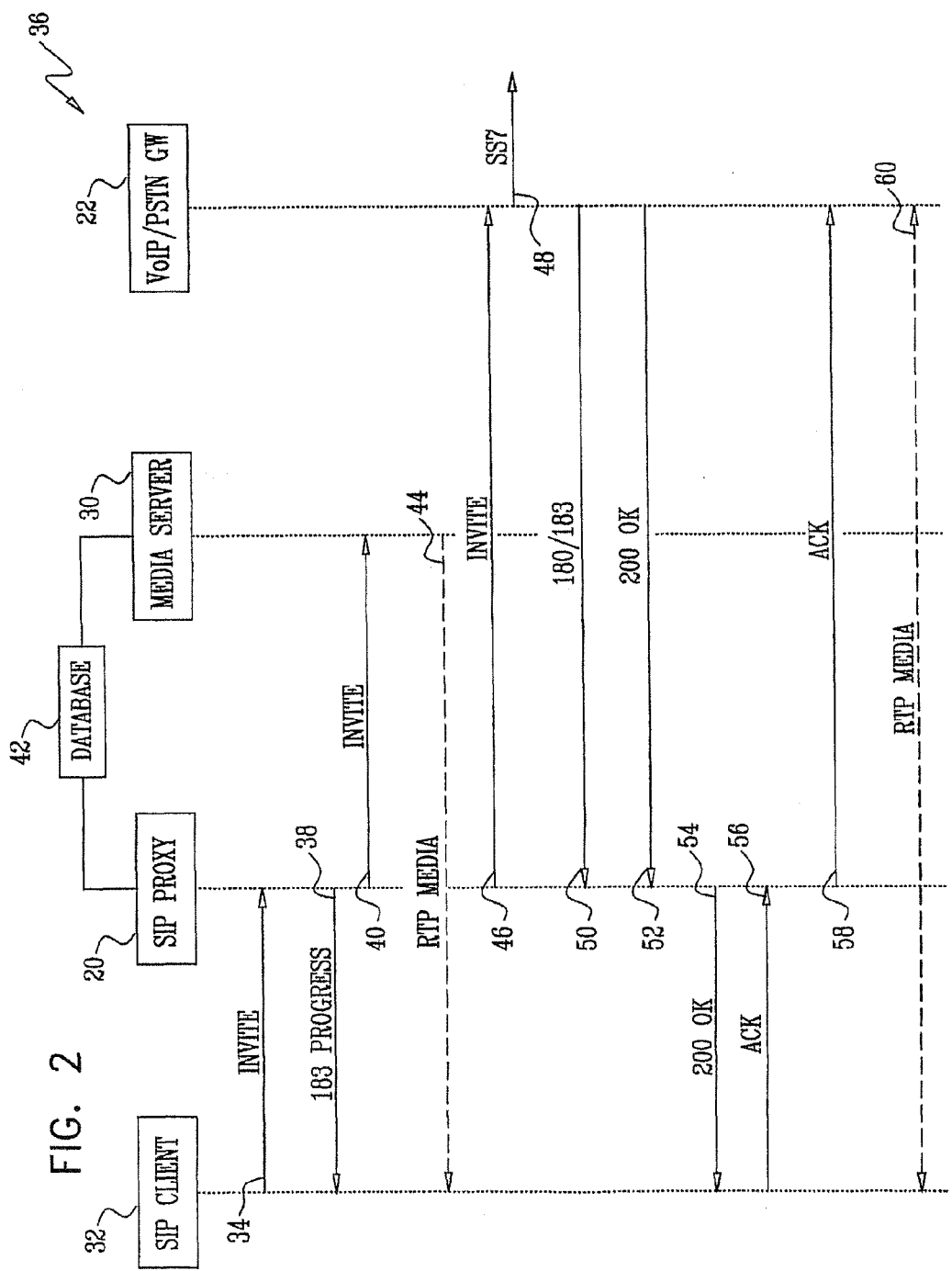
FIG. 2 is a flow chart illustrating a method of communication via synchronized telephone and data streams, in accordance with a disclosed embodiment of the invention.

Reference is now made to FIG. 2, which is a flow chart illustrating a method of communication via synchronized telephone and data streams, in accordance with a disclosed embodiment of the invention. In conventional SIP notation, a message comprises a human readable descriptor known as a "reason-phrase" and an identification number, the latter being readily decodable by a machine.

The following types of possible responses are used in SIP and generated by participants in the transactions shown in FIG. 2, where "xx" represents a numerical identifier that is assigned in the above-noted RFC 3261:

1xx-Informational Responses;
2xx-Successful Responses;
3xx-Redirection Responses;
4xx-Client Failure Responses;
5xx-Server Failure Responses; and
6xx-Global Failure Responses.

A typical session is initiated by the customer 12, who is referred to in the context of FIG. 2 as a SIP client 32, which transmits an Invite message to the proxy server 20 at a step 34 of an event-driven timeline 36. The proxy server 20, which is provided with suitable software for executing the functions described herein, responds with a 183 progress message at step 38. This is an informational response used to convey information about the progress of the call. Various components (not shown)) of the message, e.g., the reason-phrase, header fields, and message body could communicate additional details about the call progress. The message causes the SIP client 32 to listen for a notification or advertisement.

Next, at step 40, the proxy server 20 communicates an INVITE message to the media server 30. The purpose of this message is to instruct the media server 30 to transmit a notification or advertisement to the SIP client 32 during pendency of the call setup, as described above. Information regarding the profile of the client may be communicated in the invitation, for example a link to a database 42 of customer profiles that are accessible to the media server 30. Typically, the media server 30 and the database 42 are both maintained by the merchant who provides or sponsors VoIP services to the SIP client 32. Additionally or alternatively, the profile of the client may be communicated to the proxy server 20.

Next, at step 44, the media server 30 begins transmitting the notification or content to the SIP client 32 using a voice stream, or using known multimedia transmission techniques, depending on the configuration of the SIP client 32. The transmitted content may be composed according to the information about the SIP client 32 obtained from the database 42 or otherwise. This transmission may continue during the remainder of the session initiation process. In one embodiment of step 44, content is streamed to the SIP client 32 using Real Time Streaming Protocol (RTSP) in place of the conventional ringtone or network announcement. RTSP is described in IETF RFC 2326, and is similar to ITU Standard H.225.0, noted above. It provides a data delivery format that can be employed by other communications protocols.

Next, at step 46, the proxy server 20 continues with the call setup by sending an INVITE message to the gateway 22. This step may be delayed until completion of the transmission begun in step 44. Alternatively, it may be performed concurrently with the transmission.

Next, at step 48, the gateway 22 alerts the PSTN 24 using SS7 to set up the call. Then, at step 50, the gateway 22 notifies the proxy server 20 of the session progress by communicating a message 183 Session Progress, or a message 180 RINGING.

When the telephone connected to the PSTN 24 is picked up, at step 52, the gateway 22 communicates a success message 200 OK to the proxy server 20.

Next, at step 54, the proxy server 20 forwards the message 200 OK, along with any requested media addresses and information that may have developed from client interaction during the transmission begun in step 44, to the SIP client 32.

Next, at step 56, the SIP client 32 transmits an ACK message to the proxy server 20, acknowledging the call setup. The proxy server 20 forwards the ACK message to the gateway 22 at step 58.

At final step 60 the call has been set up, and information flows between the SIP client 32 and the gateway 22 directly, and out to the PSTN 24. The information can be communicated using RTSP, or other protocols, or can be simple voice communication.

It will be understood that when the recipient of the call is another SIP client or another type of VoIP client, the PSTN 24 is not accessed by the gateway 22. In some cases, even the gateway 22 may be bypassed, and the recipient contacted directly by the proxy server 20.

Alternate Embodiment 1

Figure 3:
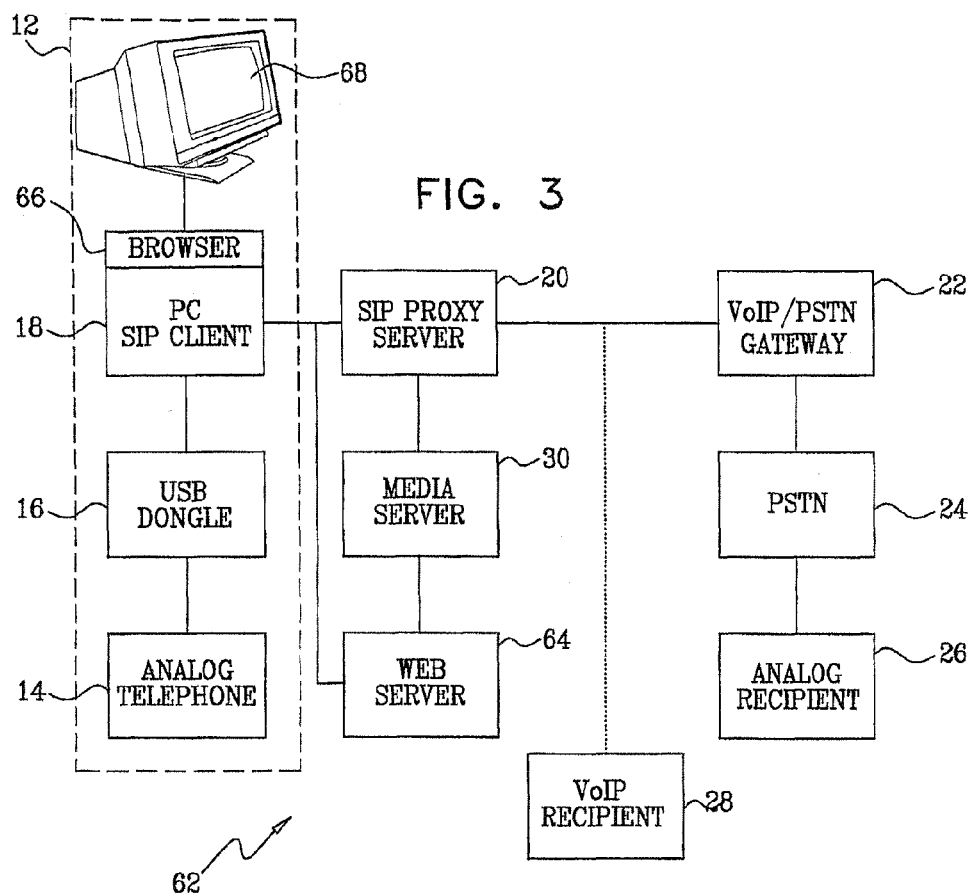
FIG. 3 is a block diagram of a system for communication via synchronized telephone and data streams, in accordance with an alternate embodiment of the invention.

Reference is now made to FIG. 3, which is a block diagram of a system 62 for communication via synchronized telephone and data streams, in accordance with an alternate embodiment of the invention. In addition to the call flow, another parallel channel may be implemented to push detailed advertising information, coupons, or other relevant information in coordination with the advertisement or other content played over the voice channel. The system 62 is similar to the system 10 (FIG. 1). However, it includes a web server 64, which is connected to the media server 30. The media server 30 and the web server 64 may be remote from one another, or co-located in the same machine. During step 44 (FIG. 2), the web server 64 feeds an advertising page to a browser 66 executing in the computer 18 of the customer 12. Thus, for example, if the customer 12 is a regular purchaser of quality wines, the advertisement voice stream might say, "Look at your computer screen now to see our special offer on premium wines," while a screen 68 displays the bottles that are available and their prices. The screen 68 could even include a "Click here to purchase" link. By synchronizing the voice advertisement with a more detailed advertisement pushed to the computer 18, the duration of the advertisement can be decreased while maintaining or even increasing the total effectiveness of the customer's interaction with the advertisement information.

Alternate Embodiment 2

Figure 4:
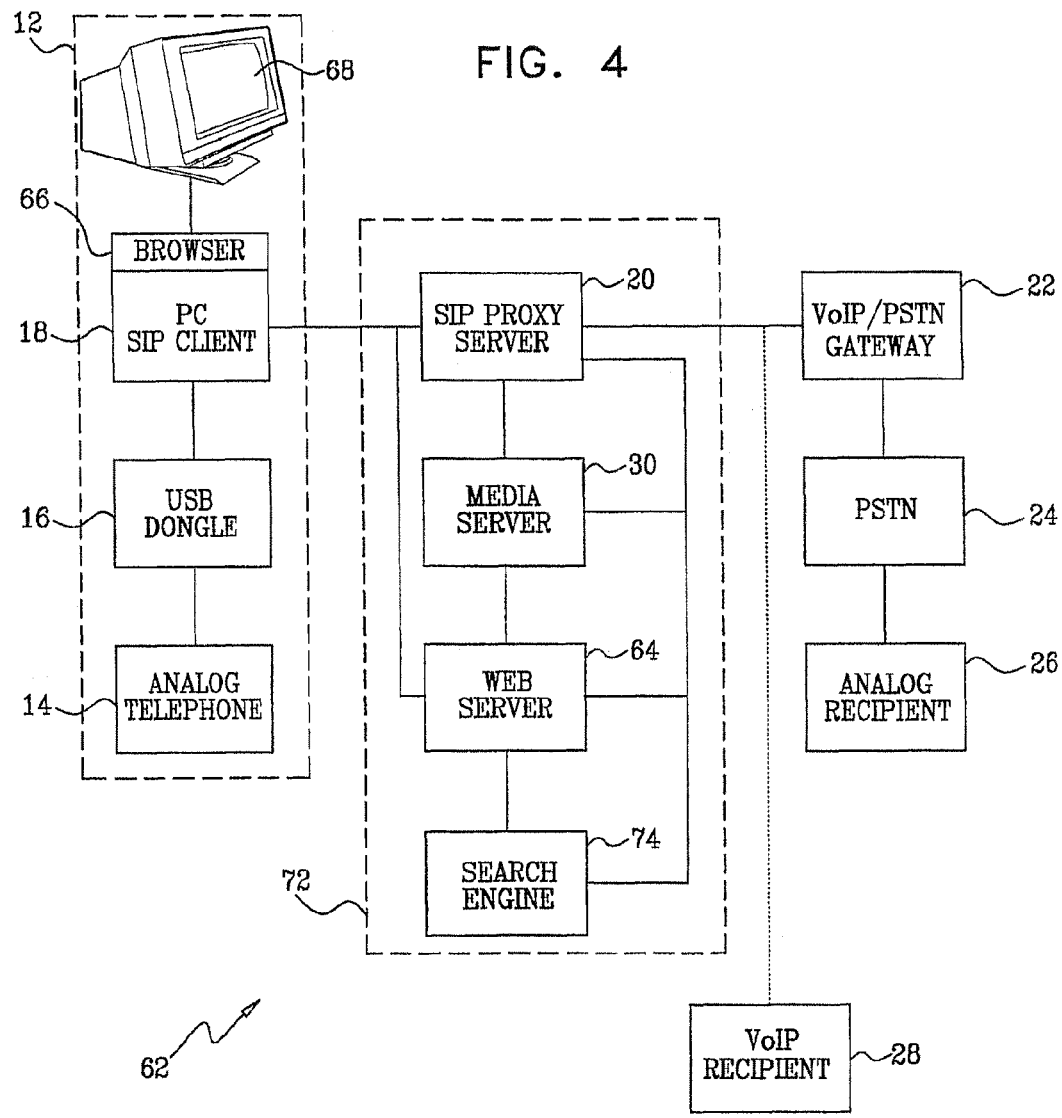
FIG. 4 is a block diagram of a system for communication via synchronized telephone and data streams, in accordance with an alternate embodiment of the invention.

Reference is now made to FIG. 4, which is a block diagram of a system 70 for communication via synchronized telephone and data streams, in accordance with an alternate embodiment of the invention. In the system 70, an integrated unit 72 employs a search engine 74 that is linked to the proxy server 20, the media server 30, optionally to the web server 64, and to the Internet in general. The search engine 74, which is capable of searching the Internet, a private network, or data contained in an enterprise, enhances the ability of the unit 72 to gather information about the customer 12, in order to more effectively compose a targeted advertisement or notification. The unit 72 thus constitutes an effective advertising engine.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for targeted advertising, comprising:
providing a first party with access to a packet telephony service;
receiving a request from the first party to establish a telephonic connection with a second party over a packet network using said packet telephony service;
in response to said request, transmitting over said packet network to the first party an audio notification provided by a third party, the audio notification being targeted according to a profile of the first party;
causing a message that is linked to the audio notification to be displayed on a display screen used by the first party while the audio notification is played to the first party; and
completing said telephonic connection upon completion of playing the audio notification.

2. The method of claim 1, further comprising the steps of:
providing the third party with information that can be used to identify the first party; and
receiving from the third party the audio notification that is to be transmitted to the first party.

3. The method of claim 1, wherein the audio notification is targeted according to a profile maintained by the third party.

4. The method of claim 1, wherein the audio notification is targeted according to a profile maintained by the packet telephony service.

5. The method of claim 1, wherein the step of completing the telephonic connection is not performed until after the entire audio notification has been transmitted to the first party.

6. The method of claim 1, wherein the message comprises a coupon that can be used by the first party.

7. The method of claim 1, wherein the audio notification comprises multimedia data that is transmitted to a computer of the first party.

8. A method of synchronized communications, comprising:
receiving a request from a first party at a packet telephony server via a packet-switched communications network, the request indicating that the first party wishes to establish a telephonic connection with a second party;
instructing a content provider to transmit an audio notification and a message that is linked to the audio notification to the first party via the network, the audio notification configured to be played to the first party while the message is displayed on a display screen used by the first party; and
completing said telephonic connection upon completion of playing the audio notification.

9. The method of claim 8, wherein the instructing step comprises providing information to the content provider that can be used to identify the first party.

10. The method of claim 8, wherein the step of completing the telephonic connection is not performed until after the content provider has finished transmitting an audio notification to the first party.

11. The method of claim 8, wherein the step of completing the telephonic connection is performed after a predetermined time period has expired after the instructing step is performed, or after the content provider has finished transmitting an audio notification to the first party, whichever occurs first.

12. The method of claim 8, wherein the instructing step comprises instructing a content provider to transmit multimedia data to a computer of the first party, the multimedia data including an audio notification.

13. The method of claim 8, wherein the instructing step comprises instructing a content provider to transmit both an audio notification to an audio device of the first party and text or graphics to a display screen of the first party.

14. The method of claim 8, wherein the instructing step comprises instructing a content provider to transmit multimedia data to a computer of the first party.

15. The method of claim 8, wherein the instructing step comprises instructing a content provider to transmit an audio notification to a telephony device of the first party and a text or graphics based coupon to a display screen of the first party.

16. The method of claim 8, further comprising obtaining information about the first party, wherein the instructing step comprises instructing the content provider to transmit an audio notification to the first party that is based on the obtained information about the first party.

17. A method for targeted advertising, comprising:
   providing a first party with access to a packet telephony service;
   receiving a request from the first party to establish a telephonic connection with a second party over a packet network using said packet telephony service;
   in response to said request, transmitting over said packet network to the first party an audio notification provided by a third party, the audio notification being targeted according to a profile of the first party; and
   completing said telephonic connection after the entire audio notification has been played to the first party.

\* \* \* \* \*